(12) United States Patent
Ishii et al.

(10) Patent No.: US 9,453,778 B2
(45) Date of Patent: Sep. 27, 2016

(54) VALVE LEAK DETECTING METHOD AND COMBUSTION EQUIPMENT

(71) Applicant: Azbil Corporation, Tokyo (JP)

(72) Inventors: Shigeki Ishii, Tokyo (JP); Satoru Yamagishi, Tokyo (JP); Yuuichi Kumazawa, Tokyo (JP)

(73) Assignee: AZBIL CORPORATION, Tokyo (JP)

( * ) Notice: Subject to any disclaimer, the term of this patent is extended or adjusted under 35 U.S.C. 154(b) by 408 days.

(21) Appl. No.: 14/092,321

(22) Filed: Nov. 27, 2013

(65) Prior Publication Data

US 2014/0150532 A1 Jun. 5, 2014

(30) Foreign Application Priority Data

Nov. 30, 2012 (JP) ................. 2012-263293

(51) Int. Cl.
| | |
|---|---|
| *G01M 3/04* | (2006.01) |
| *F23K 5/00* | (2006.01) |
| *F23K 5/16* | (2006.01) |
| *F23N 5/24* | (2006.01) |

(52) U.S. Cl.
CPC ............. *G01M 3/04* (2013.01); *F23K 5/007* (2013.01); *F23K 5/16* (2013.01); *F23N 5/24* (2013.01); *F23K 2401/20* (2013.01); *F23K 2900/05001* (2013.01); *F23N 2025/04* (2013.01)

(58) Field of Classification Search
CPC ................ F23K 2401/20; F23K 2900/05001; F23K 5/16; F23N 2025/04; F23N 5/24; G01M 3/04
See application file for complete search history.

(56) References Cited

U.S. PATENT DOCUMENTS

| | | | | |
|---|---|---|---|---|
| 2012/0167594 | A1* | 7/2012 | Poisson .................... | F02C 9/36 60/803 |
| 2013/0014563 | A1* | 1/2013 | Itoh .................... | F02M 25/0818 73/47 |

FOREIGN PATENT DOCUMENTS

| | | | | |
|---|---|---|---|---|
| CN | 103884021 A | * | 6/2014 | ............ F23K 5/007 |
| JP | 2003-130347 A | | 5/2003 | |
| JP | 2003130347 A | * | 5/2003 | |

\* cited by examiner

*Primary Examiner* — Francis Gray
(74) *Attorney, Agent, or Firm* — Troutman Sanders LLP

(57) ABSTRACT

A valve leak detecting method includes a pressure setting step before closing valves individually to set a pressure in a pipe, a first threshold value evaluating step for closing the valves after the pressure has been set to no less than the threshold value, and evaluating whether the pressure, after a specific time interval has elapsed, is at least threshold value, a second valve normalcy evaluating step for evaluating that one of the valves is operating properly or faultily if the pressure is at least or less than the threshold value, respectively, a second threshold value evaluating step for closing the valves and evaluating whether the pressure is less than the threshold value after a specific time interval has elapsed, and a first valve normalcy evaluating step for evaluating whether the valve is operating properly or faultily depending on the pressure being less or no less than the threshold value.

6 Claims, 8 Drawing Sheets

VALVE LEAK DETECTING METHOD AND COMBUSTION EQUIPMENT

CROSS REFERENCE TO RELATED APPLICATION

This application claims priority under 35 U.S.C. §119 to Japanese Patent Application No. 2012-263293, filed on Nov. 30, 2012, the entire content of which being hereby incorporated herein by reference.

FIELD OF TECHNOLOGY

The present invention relates to a valve leak detecting method for detecting a leak in a valve that is used in a fuel supplying system for combustion equipment, and to combustion equipment that uses said method.

BACKGROUND

Conventionally in combustion equipment used in boilers, or the like, fuel supplying systems that supply fuel, such as natural gas, to a burner have included two valves in series to ensure that there is no fuel leakage when the combustion equipment is stopped. Additionally, leak detection has been performed in both valves, at the time of the pre-purge of the combustion equipment, to check whether or not these valves leak. See, for example, Japanese Unexamined Patent Application Publication 2003-130347 ("the JP '347").

However, in the conventional valve leak detection disclosed in the JP '347, the leak detection is performed for both valves with at the time of the pre-purge of the combustion equipment, and thus there is a problem in that this causes the pre-purge to be time-consuming.

The present invention is to resolve problems such as set forth above, and an aspect thereof is to provide a valve leak detecting method for detecting a leak in a valve easily, and to provide combustion equipment, able to suppress the pre-purge loss.

SUMMARY

The present invention provides a valve leak detecting method through combustion equipment including a first valve that is connected to a pipe of a fuel supplying system and controls a fluid flow rate within the pipe, a second valve that is connected in series to the pipe on the downstream side of the first valve and controls a fluid flow rate within the pipe, a pressure detecting portion that detects pressure within the pipe between the first and second valves, and a leak detecting portion that performs leak detection for the first and second valves, based on a pressure within the pipe, detected by the pressure detecting portion, by controlling the first and second valves individually. The leak detecting portion performs a pressure setting step for setting the pressure within the pipe between the first and second valves to no less than a specific threshold value or to less than a specific threshold value by closing the first and second valves individually when the combustion equipment stops combustion, a first threshold value evaluating step for evaluating whether or not the pressure within the pipe, detected by the pressure detecting portion after a first time interval has elapsed, is at least the specific threshold value, after the pressure within the pipe has been set to at least the specific threshold value in the pressure setting step, a second valve normalcy evaluating step for evaluating the second valve as operating properly if the evaluation in the first threshold value evaluating step was that the pressure within the pipe is at least the specific threshold value, and for evaluating that the second valve is faulty if the evaluation was that the pressure within the pipe is less than the specific threshold value, a second threshold value evaluating step for evaluating whether or not the pressure within the pipe, detected by the pressure detecting portion after a second time interval has elapsed, is less than the specific threshold value, after the pressure within the pipe has been set to less than the specific threshold value in the pressure setting step, and a first valve normalcy evaluating step for evaluating the first valve as operating properly if the evaluation in the second threshold value evaluating step was that the pressure within the pipe is less than the specific threshold value, and for evaluating that the first valve is faulty if the evaluation was that the pressure within the pipe is no less than the specific threshold value.

Combustion equipment according to the present invention includes a first valve that is connected to a pipe of a fuel supplying system and controls a fluid flow rate within the pipe, a second valve that is connected in series to the pipe on the downstream side of the first valve and controls a fluid flow rate within the pipe, a pressure detecting portion that detects pressure within the pipe between the first and second valves, and a leak detecting portion that performs leak detection for the first and second valves, based on a pressure within the pipe, detected by the pressure detecting portion, by controlling the first and second valves individually. The leak detecting portion has a pressure setting portion that sets the pressure within the pipe between the first and second valves to no less than a specific threshold value or to less than a specific threshold value by closing the first and second valves individually when the combustion equipment stops combustion, a first threshold value evaluating portion that evaluates whether or not the pressure within the pipe, detected by the pressure detecting portion after a first time interval has elapsed, is at least the specific threshold value, after the pressure within the pipe has been set to at least the specific threshold value by the pressure setting portion, a second valve normalcy evaluating portion that evaluates the second valve as operating properly if the evaluation by the first threshold value evaluating portion was that the pressure within the pipe is at least the specific threshold value, and evaluates that the second valve is faulty if the evaluation was that the pressure within the pipe is less than the specific threshold value, a second threshold value evaluating portion that evaluates whether or not the pressure within the pipe, detected by the pressure detecting portion after a second time interval has elapsed, is less than the specific threshold value, after the pressure within the pipe has been set to less than the specific threshold value by the pressure setting portion, and a first valve normalcy evaluating portion that evaluates the first valve as operating properly if the evaluation by the second threshold value evaluating portion was that the pressure within the pipe is less than the specific threshold value, and evaluates that the first valve is faulty if the evaluation was that the pressure within the pipe is no less than the specific threshold value.

The present invention is structured as set forth above, and thus is able to suppress the pre-purge loss and to enable easy detection of a valve leak.

BRIEF DESCRIPTIONS OF THE DRAWINGS

DETAILED DESCRIPTION

An example according to the present invention will be explained in detail below referencing the figures.

Figure 1:
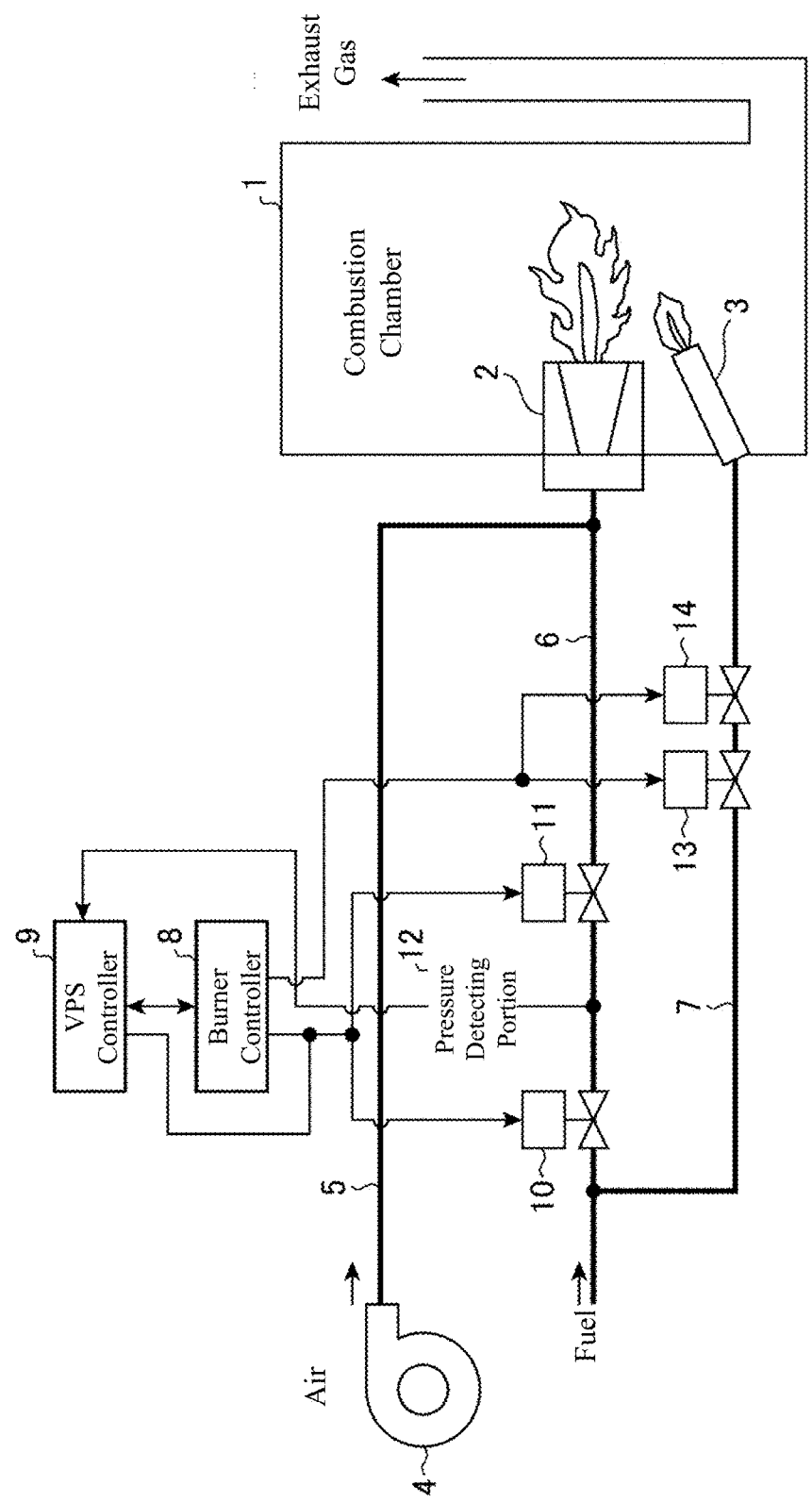
FIG. 1 is a diagram illustrating the overall structure of combustion equipment to which a valve leak detecting method according to a example according to the present invention is applied.

FIG. 1 is a diagram illustrating the overall structure of combustion equipment to which a valve leak detecting method according to the example according to the present invention is applied.

As illustrated in FIG. 1, the combustion equipment includes a main burner 2 and a pilot burner 3 that are built into a combustion chamber 1, an air supplying system 5 that supplies air to the main burner 2 through a blower 4, first and second fuel supplying systems 6 and 7 for supplying fuel, such as natural gas, to the main burner 2 and the pilot burner 3, a burner controller (also termed a "valve controlling portion") 8 that controls valves 10, 11, 13, and 14, described below, provided in the first and second fuel supplying systems 6 and 7, and a VPS (Valve Proving System) controller (leak detecting portion) 9 that performs leak detection for the valves 10 and 11.

Moreover, valves 10 and 11, which prevent leakage of the fluid within the supply pipe to the main burner 2 side when combustion in the combustion equipment is stopped, along with controlling the fluid flow rate within a single pipe, are connected in series in the first fuel supplying system 6 that supplies fuel to the main burner 2. Note that the valve (the first valve) 10 is disposed on the upstream side of the pipe, and the valve (the second valve) 11 is disposed on the downstream side. Moreover, a pressure detecting portion 12, which detects the pressure within the pipe between the valves 10 and 11, is provided between the valves 10 and 11.

Similarly, valves 13 and 14, which prevent leakage of the fluid within the supply pipe to the pilot burner 3 side when combustion in the combustion equipment is stopped, along with controlling the fluid flow rate within a single pipe, are connected in series in the second fuel supplying system 7 that supplies fuel to the pilot burner 3. Note that the valve 13 is disposed on the upstream side of the pipe, and the valve 14 is disposed on the downstream side.

Of course, in the fuel supplying systems 6 and 7, the upstream side is put under a higher pressure, so the fuel flows to the downstream side.

The structure of the VPS controller 9 will be explained next in reference to FIG. 2.

Figure 2:
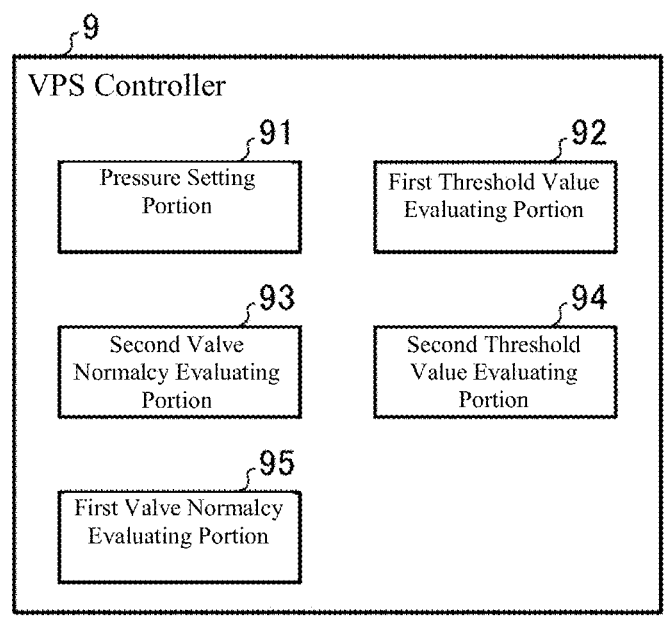
FIG. 2 is a diagram illustrating the structure of a VPS controller in the example according to the present invention.

The VPS controller 9, as illustrated in FIG. 2, is structured from a pressure setting portion 91, a first threshold value evaluating portion 92, a second valve normalcy evaluating portion 93, a second threshold value evaluating portion 94, and a first valve normalcy evaluating portion 95.

The pressure setting portion 91, by closing the valves 10 and 11 individually when stopping the combustion of the combustion equipment, causes the pressure within the pipe between the valves 10 and 11 to be no less than a specific threshold value or less than a specific threshold value.

The first threshold value evaluating portion 92, after the pressure within the pipe has been caused to be no less than a specific threshold value by the pressure setting portion 91 then, with the valves 10 and 11 in the closed state, evaluates whether or not the pressure within the pipe, detected by the pressure detecting portion 12 after a specific time interval has elapsed, is at least the specific threshold value.

If the evaluation, by the first threshold value evaluating portion 92, was that the pressure within the pipe is at least the specific threshold value, the second valve normalcy evaluating portion 93 evaluates that the valve 11 is operating properly, but if the evaluation was that the pressure within the pipe is less than the specific threshold value, the evaluation is that the valve 11 is faulty.

The second threshold value evaluating portion 94, after the pressure within the pipe has been caused to be less than a specific threshold value by the pressure setting portion 91 then, with the valves 10 and 11 in the closed state, evaluates whether or not the pressure within the pipe, detected by the pressure detecting portion 12 after a specific time interval has elapsed, is less than specific threshold value.

If the evaluation, by the second threshold value evaluating portion 94, was that the pressure within the pipe is less than the specific threshold value, the first valve normalcy evaluating portion 95 evaluates that the valve 10 is operating properly, but if the evaluation was that the pressure within the pipe is not less than the specific threshold value, the evaluation is that the valve 10 is faulty.

The method by which the VPS controller 9 of the combustion equipment, structured as described above, detects leaks in the valves 10 and 11 will be explained next.

Figure 3:
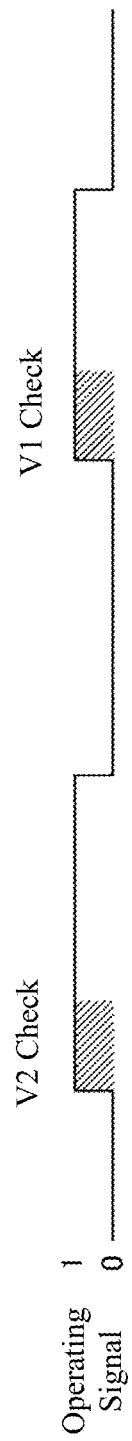
FIG. 3 is a timing chart showing the relationship between the valve leak detection and the startup of the combustion equipment and the termination of combustion, in the example according to the present invention.
Figure 4:
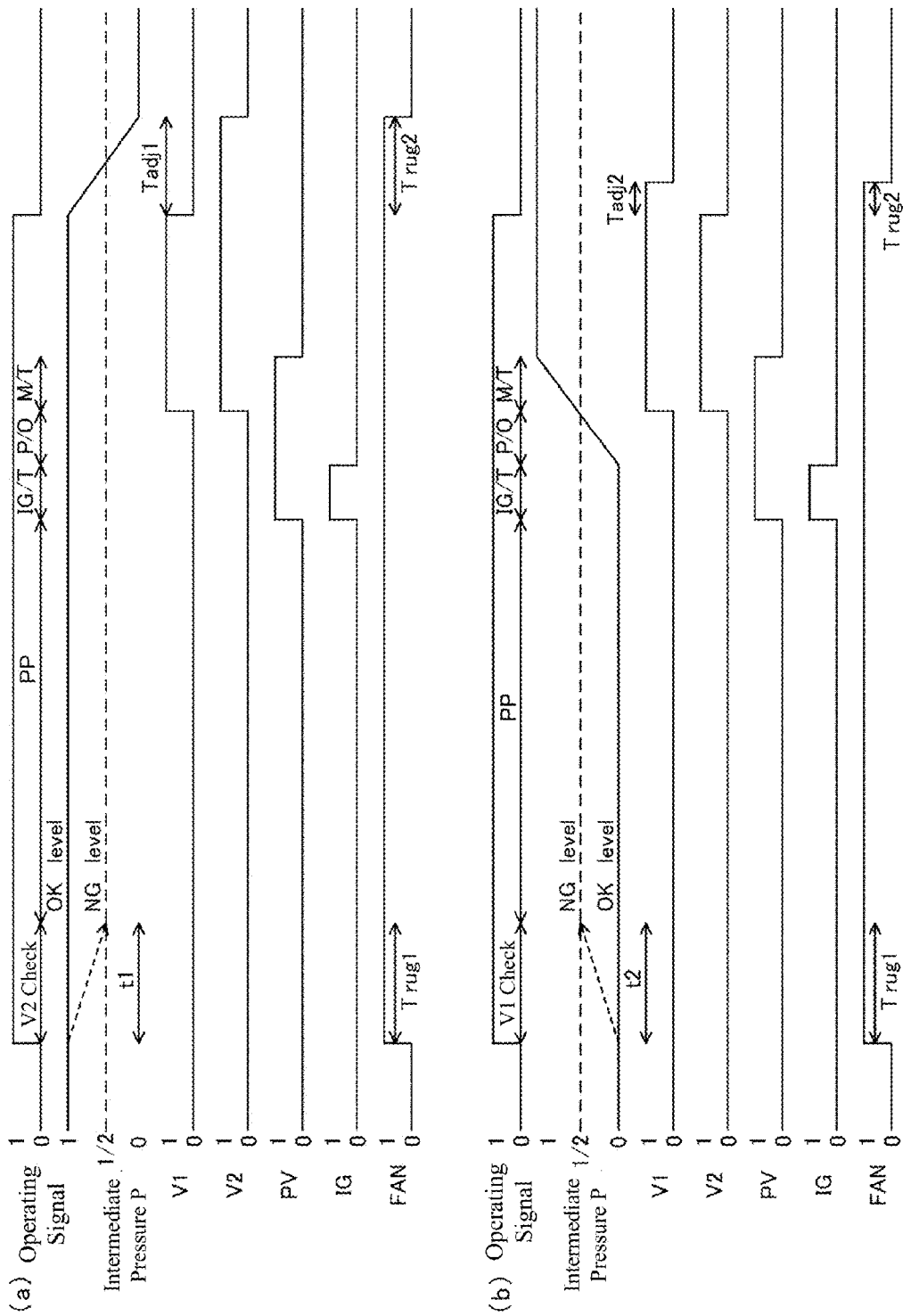
FIG. 4 is a timing chart showing the overall operation of the combustion equipment according to the example according to the present invention.

FIG. 3 is a timing chart showing the relationship between the valve leak detection and the startup of the combustion equipment and the termination of combustion, in the example according to the present invention, where, in the figure, the part with the slanted lines indicates the time intervals for detecting leaks in the valves 10 and 11. Note that "started" refers to the combusting state (including preparation for performing combustion), and "combustion stopped" refers to the non-combusting state (including preparation for extinguishing the combustion). FIG. 4 is a timing chart showing the overall operation of the combustion equipment, and FIG. 5 is a flowchart showing the valve leak detection operation by the combustion equipment.

In the leak detection for the valves 10 and 11 in the example, when the combustion equipment stops combustion the valves 10 and 11 are closed individually to set a specific value for the pressure within the pipe between the valves 10 and 11 (hereinafter termed the "intermediate pressure"). After this, as illustrated in FIG. 3, when the combustion equipment is started, the variation in the intermediate pressure is monitored by the pressure detecting portion 12 to check alternatingly for faults in the valves 10 and 11 (V1 check and V2 check).

Note that the pressure within the pipe on the upstream side of the valve 10 (the side of the fuel supply source, not shown) is termed the "upstream pressure." In the combustion equipment, over the interval wherein the operating signal is 1, and over the interval wherein the operating signal is 0 and the valves 10 and 11 are open (Trug2), the blower 4 operates to provide air through the air supplying system 5 to the main burner 2 (purge mode).

Figure 5:
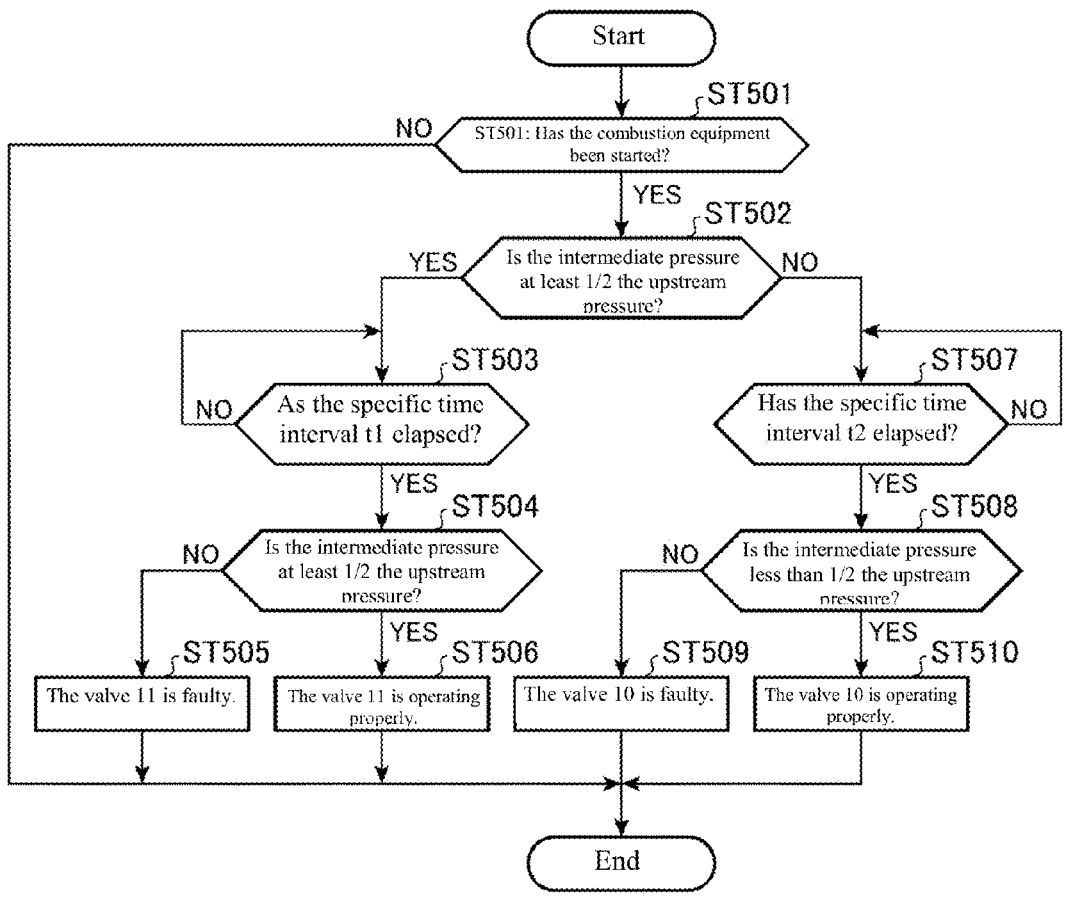
FIG. 5 is a timing chart showing the overall operation of the combustion equipment according to the example according to the present invention.

In the leak detection by the VPS controller 9 for the valves 10 and 11, as illustrated in FIG. 5, when the combustion equipment is started (where the operating signal shown in FIG. 4(*a*) has gone from 0 to 1), the pressure detecting portion 12 is used to evaluate whether or not the intermediate pressure is at least ½ of the upstream pressure (Steps ST501 and 502). Note that FIG. 4(*a*) shows a case wherein, when the combustion equipment is started, the intermediate pressure is greater than ½ of the upstream pressure (maximum value (=1)).

In this Step ST502, leak detection for the valve 11 (the V2 check in FIG. 4(*a*)) is performed when, after the prior stoppage, the intermediate pressure is evaluated as being at least ½ of the upstream pressure after Tadj1 and Tadj2 have elapsed.

In this leakage detection for the valve 11, the first threshold value evaluating portion 92 evaluates whether or not a specific time interval t1 has elapsed after the start of operation of the combustion equipment (Step ST503). Here t1 is the time interval required for the intermediate pressure to go from the maximum value to being less than ½ of the upstream pressure when a leak has occurred in the valve 11. In this Step ST503, if the evaluation is that t1 has not elapsed, then the sequence returns to Step ST503 again, and enters a standby mode.

On the other hand, if, in Step ST503, the first threshold value evaluating portion 92 evaluates that t1 has elapsed, then the pressure detecting portion 12 is used to evaluate whether or not the intermediate pressure is at least ½ of the upstream pressure (Step ST504). Note that Steps ST503 and 504 correspond to the first threshold value evaluating step in the present invention.

In this step ST504, if the first threshold value evaluating portion 92 evaluates the intermediate pressure to be less than ½ of the upstream pressure (the NG level in FIG. 4(*a*)), then the second valve normalcy evaluating portion 93 evaluates that there is a fault wherein a leak has occurred in the valve 11, performs a lockout procedure, and outputs an alarm (Step ST505).

Of the other hand if, in Step ST504, the first threshold value evaluating portion 92 evaluates that the intermediate pressure is at least the upstream pressure (the OK level in FIG. 4(*a*)), then the second valve normalcy evaluating portion 93 evaluates that the valve 11 is operating properly, with no leak (Step ST506). Note that Steps ST505 and 506 correspond to the second valve normalcy evaluating step in the present invention.

Thereafter, the combustion equipment performs various processes (operating the blower 4 alone for a specific time interval to perform a pre-purge (PP) to exhaust any residual gas that is within the combustion chamber 1, an ignition trial (IG/T) for opening the valves 13 and 14 and lighting the pilot burner 3, a pilot only (P/O) for checking whether or not the pilot burner 3 is reliably ignited, prior to opening the valves 10 and 11, and a main trial (M/T) for opening the valves 10 and 11 to ignite the main burner 2, thus transitioning to the combustion operation. Note that if the valve 11 is operating properly, then the processing time Trug1 for detecting a leak in the valve 11 may be included in the pre-purge time.

Thereafter, when the combustion equipment stops combustion (when the operating signal shown in FIG. 4(*a*) goes from 1 to 0), the pressure setting portion 91 closes the valve 10, and then after a specific time interval Tadj1 elapses, closes the valve 11 (the pressure setting step). Here Tadj1 is the time interval required for the intermediate pressure to go from the maximum value to the minimum value (=0). In this way, the intermediate pressure is caused to go to the minimum value, enabling detection of a leak in the valve 10 when starting in the combustion equipment for the next stage.

In addition, when the combustion equipment has been restarted as shown in FIG. 4(*b*), the pressure detecting portion 12 is used to evaluate whether or not the intermediate pressure is at least ½ of the upstream pressure (Step ST501 and 502). Here the intermediate pressure is less than ½ of the upstream pressure (the minimum value), so processing jumps to the leak detection procedure for the valve 10 (the V1 check in FIG. 4(*b*)).

In this leakage detection for the valve 10, the second threshold value evaluating portion 94 evaluates whether or not a specific time interval t2 has elapsed after the start of operation of the combustion equipment (Step ST507). Here t2 is the time interval required for the intermediate pressure to go from the minimum value to being at least ½ of the upstream pressure when a leak has occurred in the valve 10. In this Step ST507, if the evaluation is that t2 has not elapsed, then the sequence returns to Step ST507 again, and enters a standby mode.

On the other hand, if, in Step ST507, the second threshold value evaluating portion 94 evaluates that t2 has elapsed, then the pressure detecting portion 12 is used to evaluate whether or not the intermediate pressure is less than ½ of the upstream pressure (Step ST508). Note that Steps ST507 and 508 correspond to the second threshold value evaluating step in the present invention.

In this step ST508, if the second threshold value evaluating portion 94 evaluates the intermediate pressure to be no less than ½ of the upstream pressure (the NG level in FIG. 4(*b*)), then the first valve normalcy evaluating portion 95 evaluates that there is a fault wherein a leak has occurred in the valve 10, performs a lockout procedure, and outputs an alarm (Step ST509).

Of the other hand if, in Step ST508, the second threshold value evaluating portion 94 evaluates that the intermediate pressure is less than the upstream pressure (the OK level in FIG. 4(*b*)), then the first valve normalcy evaluating portion 95 evaluates that the valve 10 is operating properly, with no leak (Step ST510). Note that Steps ST509 and 510 correspond to the first valve normalcy evaluating step in the present invention.

Thereafter, the combustion equipment performs the various procedures (pre-purge (PP), ignition trial (IG/T), pilot only (P/O), and main trial (M/T)), and then transitions to the combustion operation. Note that if the valve 10 is operating properly, then the processing time Trug1 for detecting a leak in the valve 10 may be included in the pre-purge time.

Thereafter, when the combustion equipment stops combustion (when the operating signal shown in FIG. 4(*b*) goes from 1 to 0), the pressure setting portion 91 closes the valve 11, and then after a specific time interval Tadj2 elapses, closes the valve 10 (the pressure setting step). Here Tadj2 is the time interval required for the intermediate pressure to go from the minimum value to the maximum value. In this way, the intermediate pressure is caused to go to the maximum value, enabling detection of a leak in the valve 11 when starting in the combustion equipment for the next stage.

As described above, in the example the structure is one wherein the pressure detecting portion 12 is provided between the valves 10 and 11, and the valves 10 and 11 are closed individually when the combustion equipment stops combustion, enabling the leak detection for the valves 10 and 11 to be performed easily, making it possible to suppress the pre-purge loss.

Note that the FIG. 4 shows the case wherein the intermediate pressure is set to the maximum value or the minimum value by the pressure setting portion 91. In contrast, the intermediate value may be set to near a threshold value (½ of the upstream pressure), to shorten the standby time intervals t1 and t2.

Moreover, FIG. 4 shows the case wherein the leak detection for the valves 10 and 11 is performed when the combustion equipment is started. In contrast, the leak detection for the valves 10 and 11 may be performed when combustion is stopped, after the intermediate pressure is set by the pressure setting portion 91 when the combustion equipment stops combustion, enabling the standby time intervals t1 and t2 to be eliminated.

Figure 6:
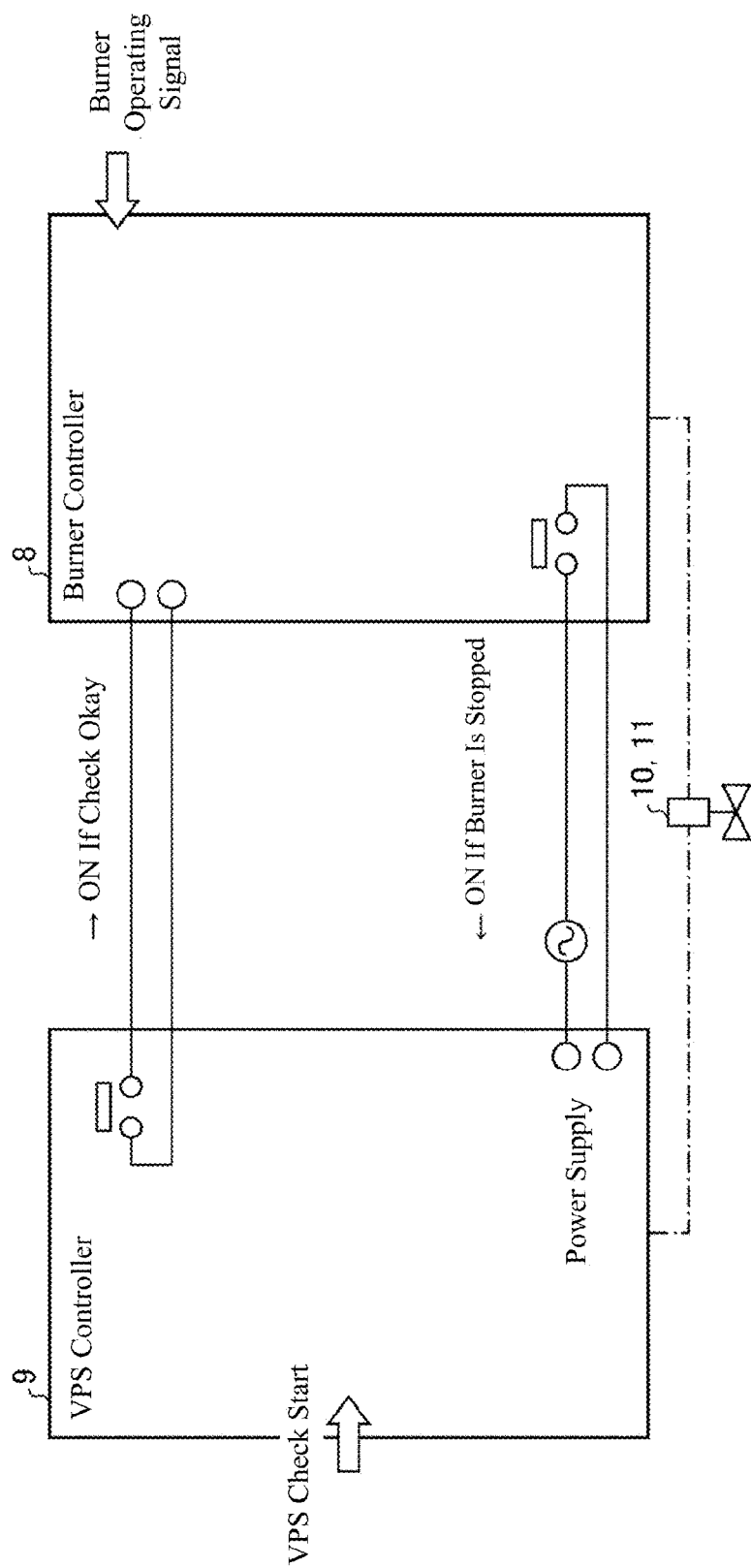
FIG. 6 is a diagram showing the linkage between the burner controller and the VPS controller in the combustion equipment according to the example according to the present invention.
Figure 7:
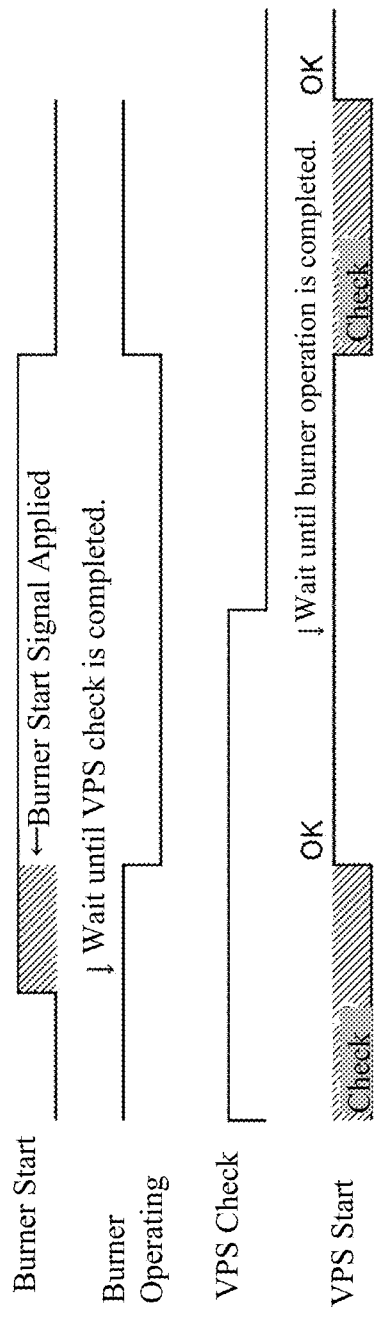
FIG. 7 is a timing chart showing the linked operation of the burner controller and the VPS controller in the combustion equipment according to the example according to the present invention.

Moreover, while, in the description above, the relationship between the burner controller 8 and the VPS controller 9 was not explained, the burner controller 8 and the VPS controller 9 control the same valves 10 and 11, so if not linked skillfully there would be a risk that the valves 10 and 11 could open unexpectedly, which would be dangerous. Given this, as illustrated in FIG. 6, for example, the contact point output from the VPS controller 9 side is provided to the burner controller 8, and, similarly, the contact point output from the burner controller 8 side is provided to the VPS controller 9. Given this, as illustrated in FIG. 7, if the VPS controller 9 is operating so that the input from the contact point output is OFF, then the burner controller 8 will be in a stopped mode (and does not report a fault), and when the burner controller 8 is operating, so that the input from the contact point output is OFF, the VPS controller 9 will be in a stopped state.

Figure 8:
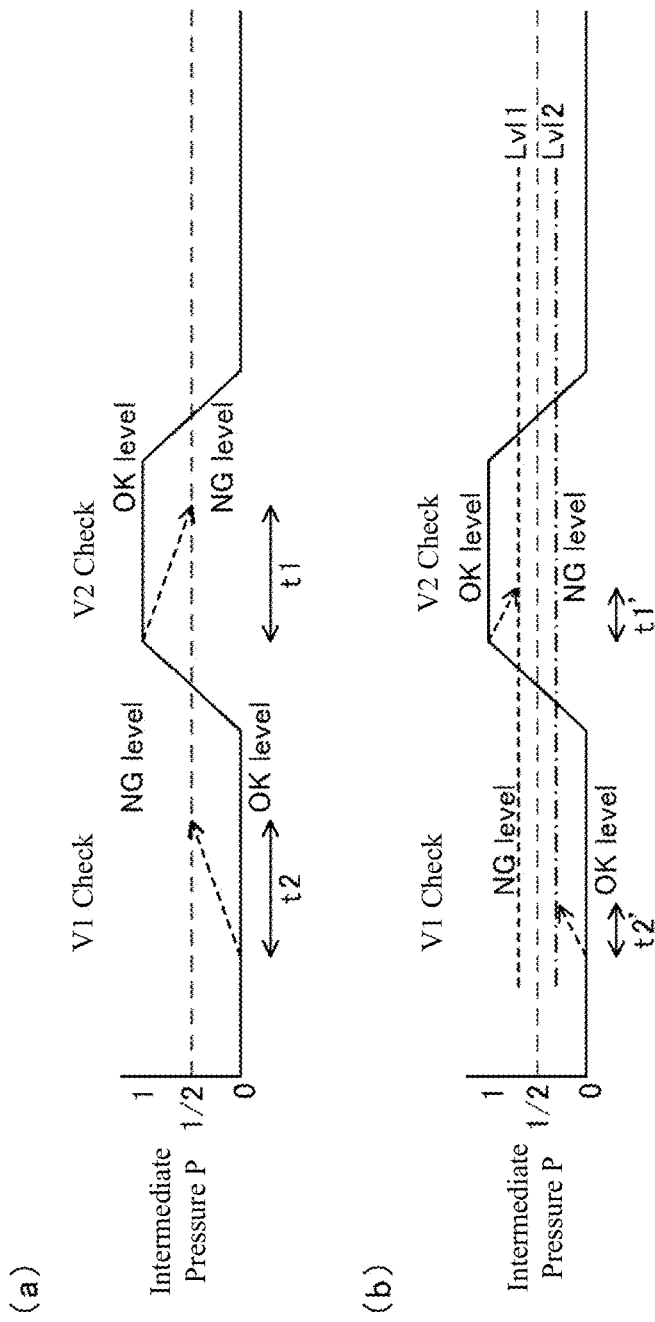
FIG. 8 is a timing chart showing the case wherein a plurality of threshold values is used in the valve leak detecting method according to the example according to the present invention.

Moreover, because, in the description above, the leak detection was performed for the valves 10 and 11, the case wherein a single threshold value (½ of the upstream pressure) was used for the intermediate pressure was illustrated. However, because the change in the intermediate pressure is gradual when there is a leak in a valve 10 or 11, the standby time intervals t1 and t2 are long, as shown in FIG. 8(a). Given this, different threshold values may be used for detecting respective leaks in the valves 10 and 11 (with a first threshold value greater than a second threshold value). In this case, either analog detection may be performed, or two pressure switches may be used, for the pressure detecting portion 12. Doing so enables the leak detection for the valve 10 to be evaluated as faulty if the intermediate pressure is equal to or greater than the second threshold value (Lvl2), and, for the leak detection for the valve 11, enables an evaluation of faulty if the intermediate pressure is less than the first threshold value (Lvl1), as illustrated in FIG. 8(b). The result is that the standby time can be shortened (t1'<t1 and t2'<t2), making it possible to shorten the processing time for the leak detection.

Note that in the invention in the present application, arbitrary structural elements in the example may be modified, or arbitrary structural elements in the example may be omitted, within the scope of the invention. For example, while in the example set forth above the burner controller 8 and the VPS controller 9 were structured as separate discrete units, instead they may be combined into a single unit that has the functions of both the burner controller 8 and the VPS controller 9.

The invention claimed is:

1. A valve leak detecting method through combustion equipment comprising:
a first valve that is connected to a pipe of a fuel supplying system and controls a fluid flow rate within the pipe;
a second valve that is connected in series to the pipe on the downstream side of the first valve and controls a fluid flow rate within the pipe;
a pressure detecting portion that detects pressure within the pipe between the first and second valves; and
a leak detecting portion that performs leak detection for the first and second valves, based on a pressure within the pipe, detected by the pressure detecting portion, by controlling the first and second valves individually, wherein:
the leak detecting portion performs:
a pressure setting step for setting the pressure within the pipe between the first and second valves to no less than a specific threshold value or to less than a specific threshold value, by closing one of the first and second valves and then closing the other of the first and second valves after a first time interval when the combustion equipment stops combustion;
a first threshold value evaluating step for evaluating whether or not the pressure within the pipe, detected by the pressure detecting portion after a first time interval has elapsed, is at least less than the specific threshold value, under the pressure within the pipe has been set to at least the specific threshold value at the time of a start-up of the combustion equipment after the pressure setting step;
a second valve normalcy evaluating step for evaluating the second valve as operating properly if the evaluation in the first threshold value evaluating step was that the pressure within the pipe is at least the specific threshold value, and for evaluating that the second valve is faulty if the evaluation was that the pressure within the pipe is less than the specific threshold value;
a second threshold value evaluating step for evaluating whether or not the pressure within the pipe at the time of start up of the combustion equipment, detected by the pressure detecting portion after a second time interval has elapsed, is less than the specific threshold value, after the pressure within the pipe has been set to less than the specific threshold value in the pressure setting step;
a first valve normalcy evaluating step for evaluating the first valve as operating properly if the evaluation in the second threshold value evaluating step was that the pressure within the pipe is less than the specific threshold value, and for evaluating that the first valve is faulty if the evaluation was that the pressure within the pipe is no less than the specific threshold value; and
the first and second threshold value evaluating steps are performed alternatingly when the combustion equipment has been started.

2. The valve leak detecting method as set forth in claim 1, wherein:
in the pressure setting step, the pressure within the pipe is caused to be near to the specific threshold value.

3. The valve leak detecting method as set forth in claim 1, wherein:
   in the pressure setting step, the pressure within the pipe between the first and second valves is set to no less than a first threshold value or less than a second threshold value that is less than the first threshold value.

4. Combustion equipment comprising:
   a first valve that is connected to a pipe of a fuel supplying system and controls a fluid flow rate within the pipe;
   a second valve that is connected in series to the pipe on the downstream side of the first valve, that controls a fluid flow rate within the pipe;
   a pressure detector that detects pressure within the pipe between the first and second valves; and
   a leak detector that performs leak detection for the first and second valves, based on a pressure within the pipe, detected by the pressure detector, by controlling the first and second valves individually, wherein:
   the leak detector comprises:
      a pressure set that sets the pressure within the pipe between the first and second valves to no less than a specific threshold value or to less than a specific threshold value, by closing one of the first and second valves and then closing the other of the first and second valves after a first time interval when the combustion equipment stops combustion;
      a first threshold value evaluator that evaluates whether or not the pressure within the pipe, detected by the pressure detecting portion after a first time interval has elapsed, is at least less than the specific threshold value, under the pressure within the pipe has been set to at least the specific threshold value by the pressure setting portion at the time of a start-up of the combustion equipment;
      a second valve normalcy evaluator that evaluates the second valve as operating properly if the evaluation by the first threshold value evaluating portion was that the pressure within the pipe is at least the specific threshold value, and evaluates that the second valve is faulty if the evaluation was that the pressure within the pipe is less than the specific threshold value;
      a second threshold value evaluator that evaluates whether or not the pressure within the pipe at the time of start up of the combustion equipment, detected by the pressure detecting portion after a second time interval has elapsed, is less than the specific threshold value, after the pressure within the pipe has been set to less than the specific threshold value by the pressure set;
      a first valve normalcy evaluator that evaluates the first valve as operating properly if the evaluation by the second threshold value evaluating portion was that the pressure within the pipe is less than the specific threshold value, and evaluates that the first valve is faulty if the evaluation was that the pressure within the pipe is no less than the specific threshold value; and
      the first and second threshold value evaluating portions perform alternatingly when the combustion equipment has been started.

5. The combustion equipment as set forth in claim 4, wherein:
   in the combustion equipment, the processing time for the valve leak detection is included in a pre-purge interval if the valve leak detection is performed when the combustion equipment is started up and the valves have been evaluated as operating properly by the first and second valve normalcy evaluators.

6. The combustion equipment as set forth in claim 4, wherein:
   the combustion equipment comprises a valve controller that controls the first and second valves;
   the valve controller is disabled while the leak detector is operating; and
   the leak detector is disabled while the valve controller is operating.

* * * * *